July 13, 1926.
F. W. SPERR, JR
1,592,649
GAS PURIFICATION APPARATUS
Original Filed Dec. 8, 1921
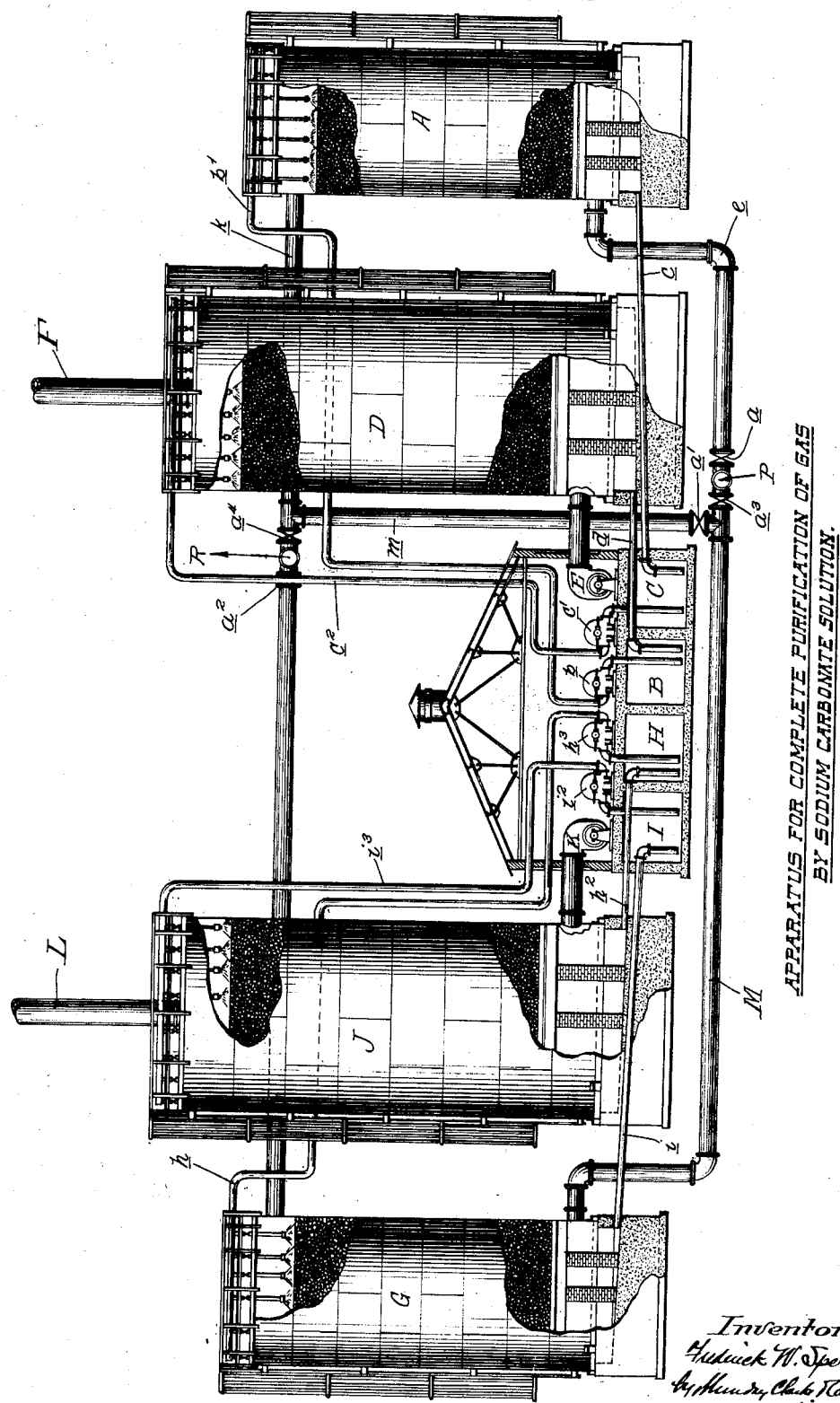

Patented July 13, 1926.

1,592,649

UNITED STATES PATENT OFFICE.

FREDERICK W. SPERR, JR., OF PITTSBURGH, PENNSYLVANIA, ASSIGNOR TO THE KOPPERS COMPANY, OF PITTSBURGH, PENNSYLVANIA, A CORPORATION OF PENNSYLVANIA.

GAS-PURIFICATION APPARATUS.

Original application filed December 8, 1921, Serial No. 520,808. Divided and this application filed May 23, 1924, Serial No. 715,401. Renewed March 3, 1926.

This invention relates to the removal of hydrogen sulphide and other noxious constitutents, such as hydrocyanic acid, from gases containing them. An object of the invention is to provide an improved apparatus for treating such gases, whereby not only the bulk of the hydrogen sulphide is removed but even the last traces of it, with the result that it will be found unnecessary to subject the purified gas to any iron oxide treatment. The invention is of particular utility in connection with a gas purification process operating generally in accordance with that process, described and claimed in Letters Patent of the United States of David L. Jacobson, dated September 6, 1921, No. 1,390,037. Broadly stated, such gas purification process consists in bringing the gas to be purified into direct contact with an alkaline absorbent agent, such as a solution of sodium carbonate, to absorb the noxious constituents from the gas, and then subjecting the absorbent agent containing the absorbed impurities to aeration to remove the absorbed impurities and to regenerate the absorbent agent so as to render it available for further gas purification. The present invention, however, is not confined to the process of the Jacobson patent but may be applied to a variety of processes characterized by the feature of substantially continuous regeneration of the gas purifying medium.

A process such as that of Jacobson requires two essential parts of apparatus, i. e., the chamber in which the gas is brought into contact with the purifying liquid, and the chamber in which the liquid containing the absorbed impurities is regenerated. In practice the first chamber is designated the "absorber" and the second the "actifier." These two terms will be employed in the following description.

The removal of the last traces of the hydrogen sulphide from the gas is a requirement that most gas companies must meet, being imposed by law in most places. According to this invention, the last traces of hydrogen sulphide are removed from the gas by a system of liquid purification, complete in itself, without any resort whatever to ordinary iron oxide purification of the gas discharged from the liquid purificatiion plant.

In addition to the general object recited above, the invention has for further objects such other improvements or advantages in operation and results as are found to obtain in the apparatus hereinafter described or claimed.

In the accompanying drawing forming a part of this specification and showing, for purposes of exemplification, a preferred form and manner in which the invention may be embodied, but without limiting the claimed invention specifically to said illustrative instance:

The figure illustrates the apparatus for carrying out the invention.

In accordance with the invention, the gas is discharged from an absorber that is operated with a normal rate of circulation of purifying liquid and gas therethrough, and such gas is passed through a second absorber, supplied with a circulation of fresh gas purifying solution. The solution from the second absorber is circulated through a second and separate actifier, for regeneration of the purifying liquid. In the second absorber, the last traces of hydrogen sulphide are readily removed from the gas. By the invention, a relatively fresh solution is readily maintained in the second absorber and actifier, and this solution is very active in removing the small amounts of hydrogen sulphide, in the second stage of the purification process. A preferred mode of operation consists in employing a relatively strong solution in the first absorber and actifier, which constitutes the first stage of the process, and a relatively weaker solution in the second absorber and actifier, which constitutes the second stage of the process. For example, a solution containing five or six percent sodium carbonate may be employed in the first absorption and regeneration stage and one containing two percent sodium carbonate in the second absorption and regeneration stage. In this way, any spray mechanically carried over from the first absorber will be caught in the second, while any spray passing out of the second will be so dilute that the mechanical loss of material is inconsiderable. The weak solution, moreover, is readily actified and maintained in a fresh condition essential for the removal of small amounts of hydrogen sulphide, while the strong solution has the advantage of a high capacity for the removal of hydrogen sulphide when relatively large amounts are present.

Referring to the accompanying drawing: the gas containing hydrogen sulphide is first passed into the absorber A. The purifying solution is pumped into the top of the absorber by the pump $b$ from the sump B and absorbs the bulk of the hydrogen sulphide from the gas (and hydrocyanic acid if any be present) together with some carbon dioxide. The gas enters the bottom of the absorber A through the gas line $e$ and discharges from the top through the gas line $k$. The foul solution discharges from the bottom of the absorber A through the solution discharge line $c$ and runs into the sump C. From this sump C the foul solution is pumped by the pump $c'$ through the solution line $c^2$ into the top of the actifier D. Air is blown upwardly through the actifier D by the fan E; the air effects a regeneration of the solution discharged into the top of the actifier D and carries out the absorbed impurities through the discharge pipe F. The regenerated solution runs from the bottom of the actifier D through the solution line $d$ back into the sump B from which it is continuously circulated through the solution line $b'$ back to the absorber A.

The gas from the absorber A, containing relatively small amounts of hydrogen sulphide (for example, from ten to sixty grains per 100 cubic feet) passes through the gas line M into the second absorber G. to undergo the second stage of the purification treatment. A relatively dilute purifying solution is pumped into the top of the absorber G through the solution line $h$ from sump H and in said absorber G the said solution absorbs from the gas the last traces of hydrogen sulphide (and hydrocyanic acid, if any be present) together with some additional carbon dioxide. The solution then flows from the bottom of the second absorber through the solution line $i$ into the sump I and is pumped therefrom by the pump $i^2$ through the solution line $i^3$ into the top of the actifier J. Air is blown upwardly through this actifier from the fan K and effects a very rapid regeneration of the fouled solution in the actitfier J. The air and impurities pass out through the pipe L. The regenerated solution from the bottom of actifier J runs through the solution line $h^2$ into sump H and from said sump H is continuously pumped back by pump $h^3$ through solution line $h$ over the absorber G. The arrangement contemplated in this invention is not necessarily limited to two sets of absorbers and actifiers, but it may, in certain cases, be advantageous to use a plurality of sets, the essential requirement being that each absorber is connected with a separate actifier. Moreover, each set may consist of two or more absorbers connected with two or more absorbers connected with two or more actifiers (this being desirable when large volumes of gas are to be handled).

Economy may be obtained by passing the air from the actifier J into the actifier D, especially when the gas entering the second stage absorber G is very low in $H_2S$. Even with the separate blowers shown, the amount of air required is much less than that required in purifying the gas completely in a single absorber. The apparatus required is smaller and less liquid circulation is needed.

The arrangement of apparatus shown has the advantage that the absorbers may be operated in parallel whenever it is unnecessary to remove the last traces of hydrogen sulphide. In this event, much larger volume of gas can be treated by operation in parallel. For this purpose, the two absorbers may be made the same size and the two actifiers also of the same size. In operating the apparatus in series for the complete removal of hydrogen sulphide as described above, valves $a$, $a'$ and $a^2$ are opened while valves $a^3$ and $a^4$ are closed. The gas enters the absorber A through the inlet pipe P and passes into the absorber G through the pipe $m$. The purified gas finally emerges through the pipe R. When it is desired to operate in parallel, valve $a'$ is closed while valves $a$, $a^3$, $a^4$ and $a^2$ are opened. The gas enters through the inlet pipe P and divides, passing into both absorbers and emerging from the top of each through the pipe R. In parallel operation, the strength of the solution is preferably kept the same in all parts of the system.

The arrangement of the apparatus shown has the further advantage that either of the absorbers may be operated as an independent unit in case the other is shut down. In operating absorber A alone, valves $a$ and $a^4$ are open and valves $a^3$, $a$ and $a^2$ are closed. In operating absorber G alone, valves $a^3$ and $a^2$ are open, while valves $a$, $a'$ and $a^4$ are closed.

The invention, as hereinbefore set forth, may be variously embodied within the scope of the claims hereinafter made.

This application is a division of my prior application for Letters Patent of the United States for gas purification process and apparatus filed December 8, 1921, Serial No. 520,808.

I claim:

1. Apparatus for effecting purification of gases, comprising, a plurality of individual absorbers, actifiers for the respective absorbers, means for maintaining a continuous circulation of liquid back and forth between each absorber and its corresponding actifier, and gas circulation means embodying controlling devices for alternatively effecting circulation of a gas through the absorbers in series or in parallel, substantially as specified.

2. Apparatus for effecting purification of gases, comprising a pair of individual absorbers, actifiers for the respective absorbers, means for maintaining a continuous circulation of liquid back and forth between each absorber and its corresponding actifier, and gas circulation means embodying controlling devices for alternatively effecting circulation of a gas through the absorbers in series or in parallel, substantially as specified.

In testimony whereof I have hereunto set my hand.

FREDERICK W. SPERR, JR.